No. 668,753. Patented Feb. 26, 1901.
E. B. KNIPPLE.
BREAD RAISER.
(Application filed Jan. 20, 1897.)
(No Model.)
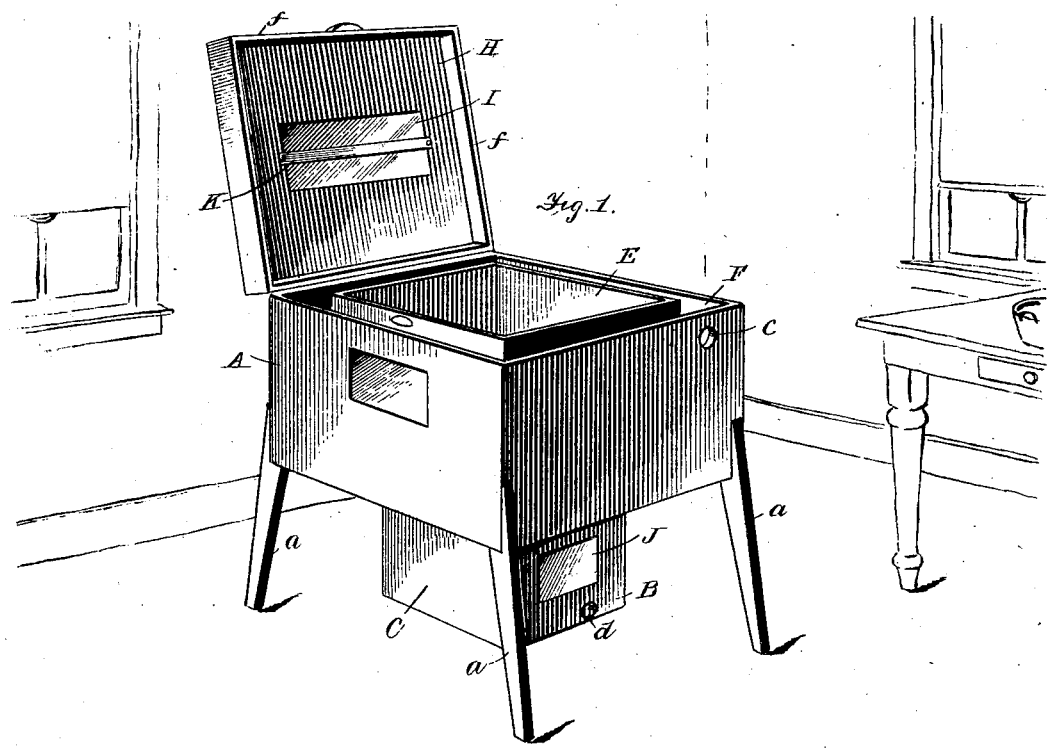
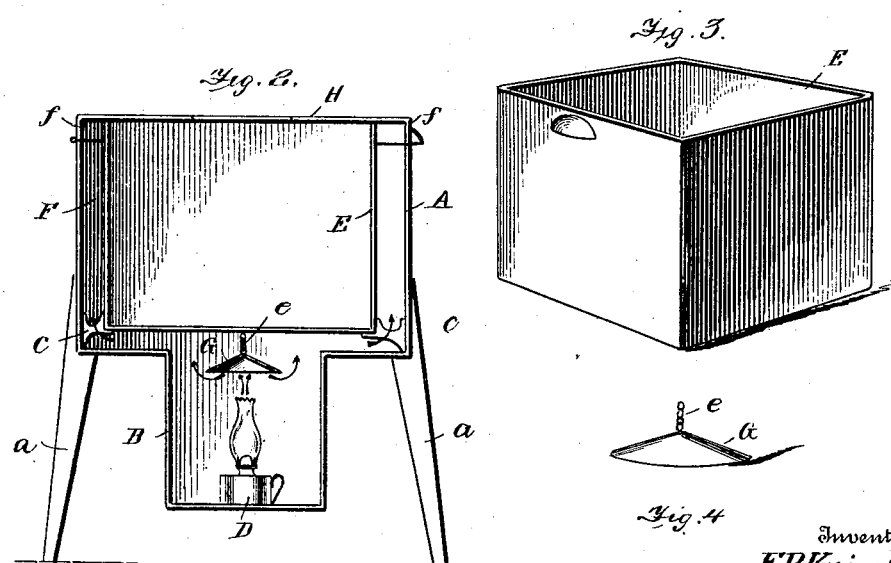

UNITED STATES PATENT OFFICE.

EDWARD B. KNIPPLE, OF BROADWAY, VIRGINIA.

BREAD-RAISER.

SPECIFICATION forming part of Letters Patent No. 668,753, dated February 26, 1901.

Application filed January 20, 1897. Serial No. 619,935. (No model.)

*To all whom it may concern:*

Be it known that I, EDWARD B. KNIPPLE, residing at Broadway, in the county of Rockingham and State of Virginia, have invented a new and useful Bread-Raiser, of which the following is a specification.

My invention relates generally to improvements in bread-raisers; and one object of the same is to provide an improved construction for the purpose of effecting the raising of bread, consisting of an inner casing or dough-receptacle and an outer casing, the said casings constituting between them a hot-air chamber which entirely surrounds the dough-receptacle and which is adapted to receive a heat-generating means for accomplishing the desired result.

A further object is to provide a lid or cover which when lowered closes the hot-air chamber and dough-receptacle from communication with the room and also from communication with each other, thus serving to prevent dust or other foreign substances from passing thereinto from without and also preventing any gases which may accumulate in the hot-air chamber passing into the dough-receptacle.

Another object is to provide a means for deflecting the heat and causing the same to circulate around the dough-receptacle to effect the end in view.

The invention relates to other details of construction, which will be fully described hereinafter and particularly pointed out in the claim.

In the accompanying drawings, Figure 1 is a perspective view of my invention with the cover in a raised position. Fig. 2 is a central vertical section of the same with the cover or lid in a closed or lowered position. Figs. 3 and 4 are perspective views, respectively, of the dough-receptacle and the heat-deflector removed from the outer casing.

Referring to the drawings, A indicates the outer casing, supported by legs *a* and contracted or made smaller at its lower or bottom portion to form the heating-chamber B. This heating-chamber B has the door C for the purpose of permitting ready access thereto for lighting or extinguishing the lamp D, by which heat is generated, or for cleaning the lamp, as will be readily understood. A damper *d* is also provided for regulating the amount of air admitted to this chamber.

Placed removably within the outer casing A and adapted to rest upon brackets *c*, secured to the inner sides of said casing, is the inner casing or dough-receptacle E, of such size as to form a substantially uniform space F between its walls and the walls of the casing A, said space constituting a hot-air chamber entirely surrounding the dough-receptacle and communicating with the heating-chamber B. Suspended by chain *e* from the bottom of receptacle E and above lamp D is a deflector G, of cone shape, for the purpose of deflecting the heat, as indicated by arrows, Fig. 2, and thus preventing the bottom of the dough-receptacle just above the lamp becoming heated to such a degree as to burn or cook the dough contained therein and insuring a circulation of the heat about the said receptacle.

It will be noticed by reference to Fig. 2 that the walls of the receptacle E extend above the walls of the casing A far enough to permit of the fingers being inserted in the finger-holes at the top of the receptacle for putting it in or taking it out of the casing. The amount of this extension above the top of the casing is a distance equal to the depth of the depending flange *f* of the cover or lid H, hinged to the casing A, so that when the cover is in a closed position, as shown in said figure, the surrounding flange *f* rests upon the walls of casing A, while the lid proper seats upon the walls of the dough-receptacle E, thus closing the said receptacle and the hot-air chamber from dust or other foreign substances in the room and also closing the dough-receptacle from communication with the hot-air chamber, whereby any gases which may accumulate in said chamber are prevented from reaching the dough. In the top of said lid is placed a glass or other transparent plate I, so that the contents of the dough-receptacle may be viewed from time to time as desired, and the lamp-chamber is also provided with a similar plate J for the purpose of inspecting the operation of the lamp. A thermometer K is placed on the under side of the lid beneath the glass plate, so that the condition of the temperature may be readily ascertained, and heat uniformly generated.

By locating the thermometer directly under the glass plate it is located within the dough-raising receptacle and the temperature therein is indicated and not the temperature at the outer wall, which may be different from what it is on the interior of the receptacle from the effects of drafts of air or other causes.

Outlets $o$ and $o'$ in the front and back, respectively, of the casing A are provided for the escape of gases from the hot-air chamber.

The dough-receptacle is readily removable for placing the dough therein or removing the same therefrom, as will be readily understood.

From the above description it will be seen that I have produced a very simple, convenient, and effective bread-raiser in which the heat is deflected and caused to circulate about a dough-receptacle, which is closed from gases from the hot-air chamber and from dust and other foreign substances from without, and which is very cheap in construction.

Having thus fully described my invention, what I claim, and desire to secure by Letters Patent, is—

In a dough-raising apparatus, the combination with a casing, the bottom of which is provided with a heating-chamber, and the upper portion is perforated, of a removable receptacle within the casing at a substantially uniform distance from the same, the top edges of which extend above the top of the casing, a cover hinged to the casing whose edges are provided with a flange of a width equal to the distance that the receptacle extends above the top of the casing, whereby the cover engages with the top of the receptacle and closes the same and the casing, a deflector below the bottom of the receptacle, and a heater below the deflector, substantially as described.

EDWARD B. KNIPPLE.

Witnesses:
J. W. BASORE,
H. J. WITTIG.